US007314646B2

(12) United States Patent
Sawyer et al.

(10) Patent No.: US 7,314,646 B2
(45) Date of Patent: Jan. 1, 2008

(54) LOW FRICTION AND LOW WEAR POLYMER/POLYMER COMPOSITES

(75) Inventors: Wallace Gregory Sawyer, Gainesville, FL (US); David Lawrence Burris, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 253 days.

(21) Appl. No.: 10/914,615

(22) Filed: Aug. 9, 2004

(65) Prior Publication Data

US 2006/0030681 A1 Feb. 9, 2006

(51) Int. Cl.
*B05D 5/12* (2006.01)
(52) U.S. Cl. .................. 427/58; 524/545; 428/209; 525/191
(58) Field of Classification Search .............. 427/58; 428/209; 524/545; 525/191
See application file for complete search history.

(56) References Cited

U.S. PATENT DOCUMENTS

| 4,592,782 A | * | 6/1986 | Davies ................ 75/253 |
| 5,039,575 A | * | 8/1991 | Mori et al. ............... 428/463 |
| 6,695,285 B1 | | 2/2004 | Hotton et al. |
| 6,809,153 B2 | * | 10/2004 | Jeong et al. .............. 525/191 |

FOREIGN PATENT DOCUMENTS

EP 0987298 A1 3/2000

WO WO 03/103955 A1 12/2003

OTHER PUBLICATIONS

Wang et al. "The friction and wear characteristics of nanometer SiC and polytetrafluoroethylene filled polyetheretherketone", Wear, 2000, 243:140-146.
Zhang et al. "Wear of PEEK composites related to their mechanical performances", Tribology International, 2004, 37:271-277.
Yamamoto et al. "Friction and wear of water lubricated PEEK and PPS sliding contacts Part 2. Composites with carbon or glass fibre", Wear, 2004, 257:181-189.

(Continued)

*Primary Examiner*—David W. Wu
*Assistant Examiner*—Henry S. Hu
(74) *Attorney, Agent, or Firm*—Edwards Angell Palmer & Dodge LLP; Peter F. Corless

(57) ABSTRACT

A composite material having superior tribological properties includes a first polymer being a transfer film forming polymer and a second polymer mixed with the first polymer. The first polymer is at least 10 weight % of the composite and the composite provides a wear rate of $<10^{-7}$ mm$^3$/Nm and an average friction coefficient of said composite no more than 0.15. The first polymer can be PTFE and the second polymer a polyaryletherketone (e.g., PEEK). A method of forming composites includes the steps of providing a plurality of transfer film forming polymer particles and second polymer particles, and molding or extruding the particles at a temperature sufficient to allow softening and mobilization of at least one of the transfer film forming polymer particles and the plurality of strengthening phase polymer particles to form an interconnected network, wherein the composite formed provides a wear rate of $<10^{-7}$ mm$^3$/Nm.

11 Claims, 8 Drawing Sheets
(4 of 8 Drawing Sheet(s) Filed in Color)

OTHER PUBLICATIONS

Engineering Information Inc., NY, NY, 2004, Peng et al. "Tribological behavior of inorganic nano-particulates and polytetrafluorethylene filled polyetheretherketone". Abstract.

Engineering Information Inc., NY, NY, 2002, Jun-Hong et al. "Triboloical behavior of carbon-fiber-reinforced polymide composites under water lubrication". Abstract.

B. J. Briscoe and Lin Heng Yao, The Friction and Wear of Poly(Tetrafluoroethylene) Poly(Etheretherketone) Composites: an Initial Appraisal of the Optimum Comosition, Wear, 1986, 105:357-374.

Jayashree Bijwe, Sukanta and Anup Ghosh, Influence of PTFE content in PEEK-PTFE blends on mechanical properties and triboperformance in various wear modes, Wear, 2005, 258: 1536-1542.

* cited by examiner

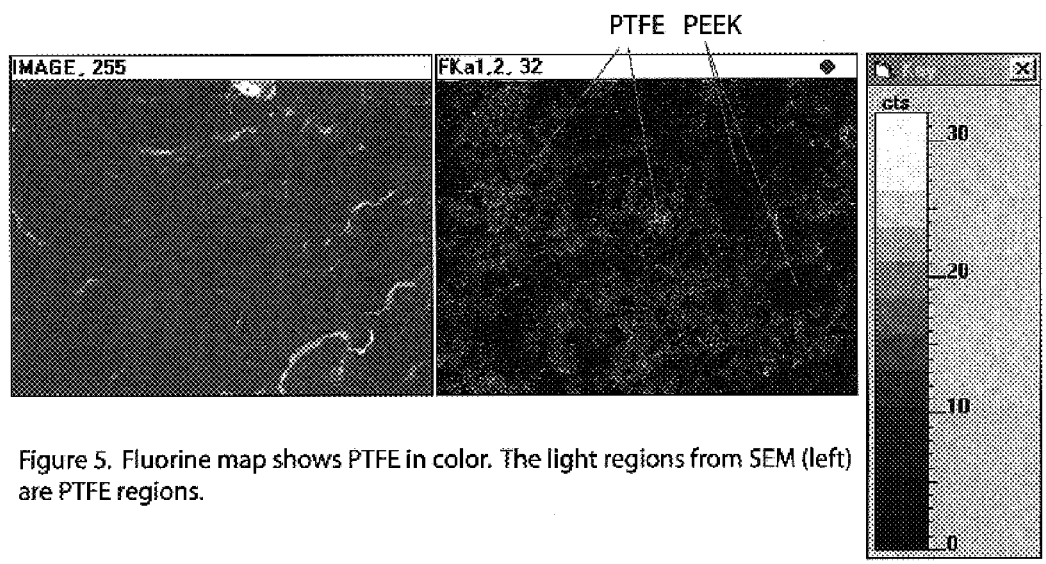
Figure 5. Fluorine map shows PTFE in color. The light regions from SEM (left) are PTFE regions.

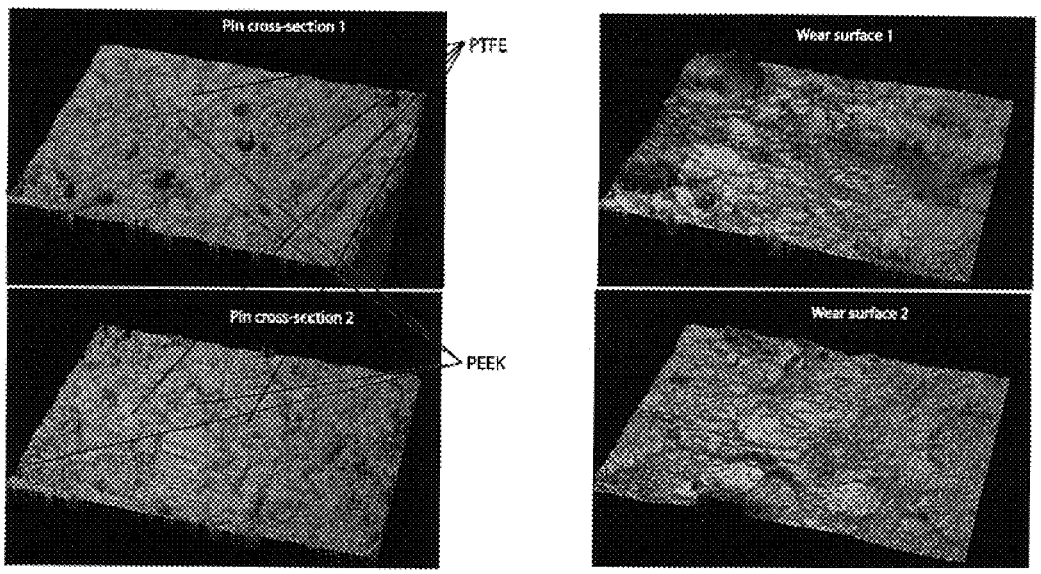

Figure 7. Surface interferometry. Cross-sections show PTFE regions raised above smaller regions of PEEK at different locations in a 'pre-worn' state. The scans of the wear surface show almost 100% PEEK. The PTFE regions are consumed in sliding and transfer film developement leaving wear resistant PEEK behind. PTFE and PEEK regions for these scans were determined optically and appear as in the SEM pictures.

FIGURE 6

LOW FRICTION AND LOW WEAR POLYMER/POLYMER COMPOSITES

STATEMENT REGARDING FEDERALLY SPONSORED RESEARCH OR DEVELOPMENT

The United States Government may have certain rights to this invention pursuant to an Air Force Office of Scientific Research-Multidisciplinary University Research Initiative URI (AFOSR-MURI) contract.

CROSS-REFERENCE TO RELATED APPLICATIONS

Not applicable.

FIELD OF THE INVENTION

The invention relates to polymer/polymer composites, more specifically to low wear polymer/polymer composites.

BACKGROUND OF THE INVENTION

Solid lubrication offers many benefits over conventional oil-based hydrodynamic and boundary lubrication. Solid lubrication systems are generally more compact and less costly than oil lubricated systems since pumps, lines, filters and reservoirs are usually required in oil lubricated systems. Greases can contaminate the product of the system being lubricated, making it undesirable for food processing and both grease and oil outgas in vacuum precluding their use in space applications. One of the primary goals of a solid lubricant is obtaining low friction.

Polytetrafluoroethylene (PTFE) is known by the trade name TEFLON®. PTFE is well known as a low friction material and has thus received much attention for use as a solid lubricant. It also has other desirable properties including, high melting temperature, chemical inertness, biocompatibility, low outgassing and low water absorption. However, PTFE wears much more rapidly than most other polymers preventing its use as a bearing material in many cases.

It is known that copper and graphite greatly improve the life of PTFE when used as fillers. Glass fibers and micron sized ceramics have also been shown to improve wear resistance of PTFE. These fillers are thought to reduce wear because they preferentially support the load. Briscoe et al (Briscoe, B. J., L. H. Yao, et al. (1986). "The Friction and Wear of Poly(Tetrafluoroethylene)-Poly(Etheretherketone) Composites—an Initial Appraisal of the Optimum Composition." Wear 108(4): 357-374) disclose a PEEK/PTFE polymer/polymer composite, comprising a plurality of discrete PTFE particles in a polyether ether ketone (PEEK) matrix. PEEK has low wear and high friction and PTFE has high wear and low friction. Briscoe et al. found a disproportionate drop in microhardness, compressive strength and Young's modulus of the PEEK matrix with the addition of small amounts of PTFE, indicative of poor adhesion at the particle-matrix interface. The wear rate of the composite was reported to increase linearly from unfilled PEEK to 3 times the wear rate of unfilled PEEK for the 70 wt % PTFE composite. Wear was reported to be accelerated beyond 70 wt % PTFE. Briscoe et al. concluded that the 10 wt % PTFE composite is optimal.

SUMMARY OF INVENTION

A composite material having superior tribological properties includes a first polymer comprising a transfer film forming polymer and a second polymer for strengthening the composite mixed with the first polymer. The first polymer comprises at least 10 weight % of the composite and the wear rate of the composite is $<10^{-7}$ mm$^3$/Nm. The second polymer can comprise between 15 wt. % and 90% wt. % of the composite. In a preferred embodiment, the wear rate of the composite is $<10^{-8}$ mm$^3$/Nm. The composite also provides a COF generally comparable or lower than that of the film forming polymer. The COF of the composite is generally less than 0.15, and preferably is less than 0.13, such as 0.12, 0.11 and most preferably less than 0.10. Thus, composite materials according to the invention combine very low wear with very low friction.

Tribological testing and parameters described and claimed herein are based on the use of a reciprocating tribometer as further described in the Examples. In tests other than environmental tests, pins were ¼ in×¼ in×½ in long with a 250 N normal load. The reciprocation length was 1 in. The resulting pressure was 6.3 MPa. Sliding velocity was 2 in/s.

In certain inventive embodiments; the softening or "melting" points of the first and second polymer are within 40° C., and preferably within 20° C. of one another. In a preferred embodiment, the first polymer is PTFE and the second polymer is a polyaryletherketone (e.g. PEEK). PTFE has a reported "melting point" at about 327° C. and PEEK has a reported "melting point" of about 340 to 344° C.

The second polymer is preferably an interconnected network as distinguished from a dispersed particle phase. As defined herein, an interconnected polymer network is defined as a structure within the composite which would remain connected if the other polymer were to be selectively removed. For example, a wear test can be used to selectively remove the film forming polymer. Following such a test, the interconnected network remains present and does not separate into discrete particles. Solvent immersion under appropriate conditions can also be used to selectively remove the film forming polymer.

In a preferred embodiment, the transfer film forming polymer can also be an interconnected network. In this embodiment, the phase composed of the first polymer and the phase composed of the second polymer forms an interpenetrating network structure. An interpenetrated network structure can be confirmed, for example, based on the results of an immersion treatment in a solvent as follows. Described specifically, the sample of the polymer composition is immersed in a first solvent for a sufficient period of time under conditions whereby the second polymer component can be selectively extracted. On the other hand, another sample of the polymer composition is immersed in a different solvent for sufficient time under conditions whereby the first polymer component can be selectively extracted. So, if there remains a substance without being dissolved or dispersed in each of the above-described treatments, it can be judged that the phase composed of the first polymer component and the phase composed of the second polymer component each have been distributed in the integral form, in other words, they have been distributed in an interpenetrating network structure.

Although a preferred embodiment is a PTFE/PEEK composite, the first polymer can be other mechanically strong polymers, such as ultra high molecular weight polyethylene (UHMWPE), defined herein as having an average molecular weight of at least 3 million daltons. The second polymer can be a polyimide, nylon, polycarbonate or acrylonitrile butadiene styrene (ABS).

A molded or formed product can be made of the polymer composite, including bearings or bushings. In another embodiment, an article can include a base polymer consisting essentially of the first or second polymer integrated with said base polymer layer, such as through polymer bonding across the interface between the base polymer article and the composite. The composite can comprise a first polymer transfer film forming polymer, and a second polymer for strengthening the composite, where the first polymer comprises at least 10 weight % of the composite and the wear rate of the composite is $<10^{-7}$ mm$^3$/N. In this embodiment, the base polymer and the second polymer can comprise PEEK and the first polymer PTFE.

A method of forming high performance composite materials includes the steps of providing a plurality of transfer film forming polymer particles and a plurality of strengthening phase polymer particles, and extruding or molding the plurality of transfer film forming polymer particles and plurality of strengthening phase polymer particles at a temperature at or above the softening point of at least one, and preferably both, the transfer film forming polymer and the strengthening phase polymer to allow softening and mobilization of at least one of the plurality of transfer film forming polymer particles and said plurality of strengthening phase polymer particles to form an interconnected network, wherein a composite polymer is formed which provides a wear rate of $<10^{-7}$ mm$^3$/Nm. The method preferably further comprises the step of jet milling the particles before the molding step.

The plurality of transfer film forming polymer particles can average from 1 to 100 μm and the plurality of strengthening phase polymer particles can average from 50 nm to 1 μm. In a preferred embodiment, both the first and second polymers comprise interconnected networks, thus rendering the composite an interpenetrated network structure.

The strengthening phase polymer can comprise a polyaryletherketone and the transfer film forming polymer can comprise PTFE. An average friction coefficient of the composite can be no more than 0.15 and a wear rate of the composite can be $<10^{-8}$ mm$^3$/Nm.

In another embodiment, the method further comprises the steps of providing a base polymer article consisting essentially of the film forming polymer or the strengthening phase polymer, disposing the composite and the base polymer article together, and heating the composite to a temperature sufficient to allow the composite to become integrated with said base polymer layer, such as through polymer bonding across the interface between the base polymer article and the composite.

BRIEF DESCRIPTION OF THE DRAWINGS

The patent or application file contains at least one drawing executed in color. Copies of this patent or patent application publication with color drawings(s) will be provided by the Office upon request and payment of the necessary fee. A fuller understanding of the present invention and the features and benefits thereof will be accomplished upon review of the following detailed description together with the accompanying drawings, in which:

FIG. 5(a) is a scanned SEM image and (b) a scanned fluorine map of a PTFE/PEEK composite according to the invention. The light portions in each are PTFE regions.

FIG. 6 are scanned images of cross sections of PTFE/PEEK composite according to the invention using surface interferometry before and after wear testing.

DETAILED DESCRIPTION

Figure 1:
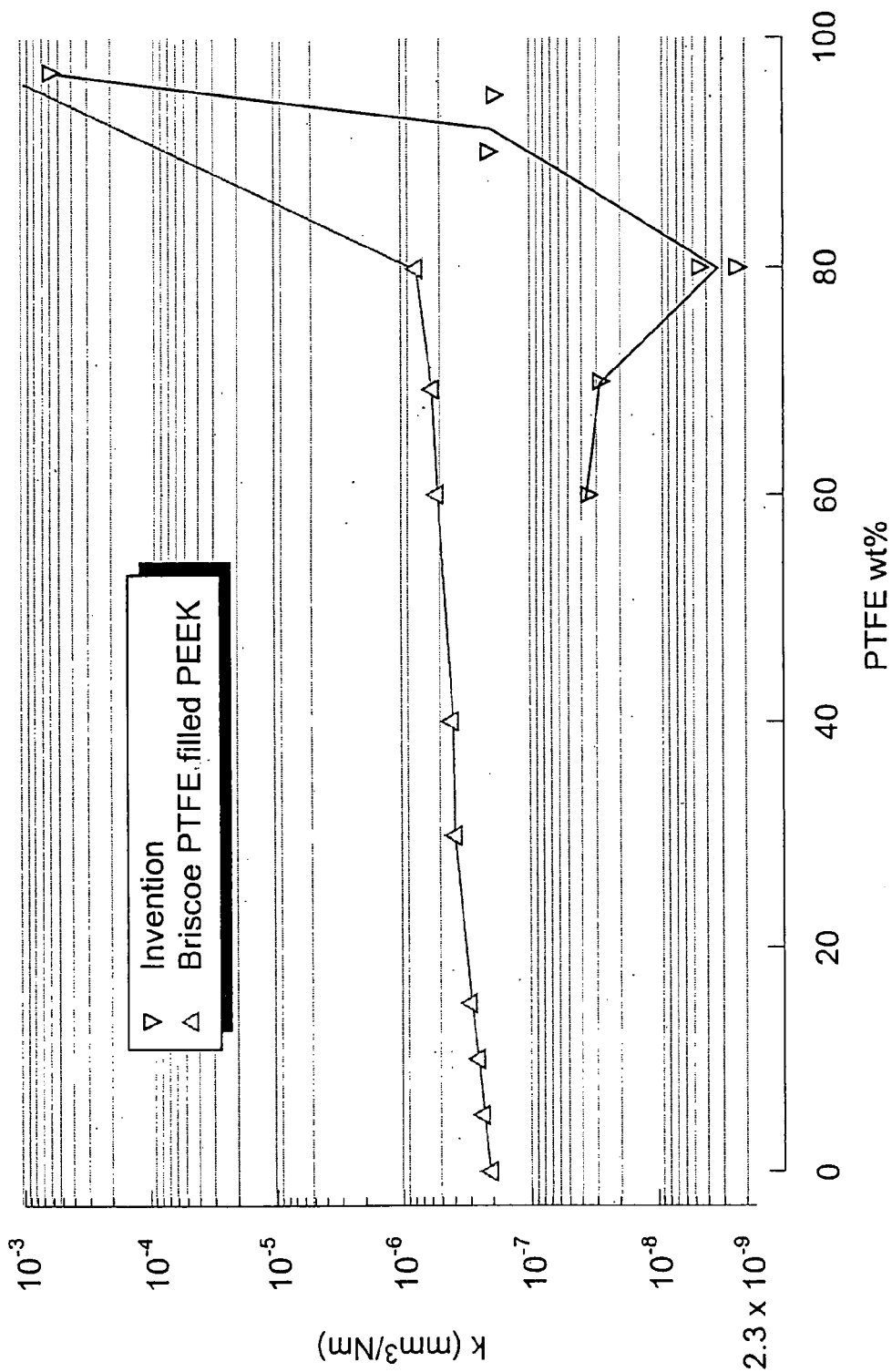
FIG. 1 shows the wear rate (y-axis) of an exemplary PTFE/PEEK composite according to the invention as a function of PEEK wt % (x-axis) as compared a PEEK/PTFE composite according to the process disclosed by Briscoe et al.

A composite polymeric material having superior tribological properties comprises a first polymer comprising a transfer film forming polymer, and a second polymer for strengthening the composite mixed the first polymer. The first polymer comprises at least 10 weight % of the composite and the wear rate of the composite is $<10^{-7}$ mm$^3$/Nm. The composite also provides a COF generally comparable or lower than that of the film forming polymer. The COF of the composite is generally less than 0.15, and preferably is less than 0.13, such as 0.12, 0.11 and most preferably less than 0.10.

In one embodiment, the composite comprises a PTFE/PEEK composite. Industrially scalable methods for forming the same are also described herein. The composite is generally vacuum compatible, inert, biocompatible, low friction, easy to bond to, very low wear, high temperature capable, space compatible and chemically resistant.

Exemplary transfer film forming polymers include PTFE and high molecular weight linear polyethylene. Linear polyethylene is normally produced with molecular weights in the range of 200,000 to 500,000 daltons, but can obtained commercially having average molecular weights of about three to six million daltons, or more (referred to as ultra-high molecular weight polyethylene, or UHMWPE). Other transfer film forming polymers include polyarylenesterketones.

The second polymer is generally a mechanically strong, low wear and high friction polymer. For example, the second polymer can comprise polyimides, nylons, polycarbonates, acrylonitrile, butadiene styrenes (ABS) and PEEK.

Although the composition can be formed from first polymer comprising a transfer film forming polymer and a second polymer for strengthening the composite, other materials can be included in the composite. For example, two or more film forming polymers can be used as well as two or more strengthening phase polymers. Other materials may be added to the composite to enhance certain properties, including but not limited to graphite, molybdenum disulfide, and carbon nanotubes. Thus, more generally, composites according to the invention have as their main components a first polymer comprising a transfer film forming polymer, and a second polymer for strengthening the composite.

Although not needed to practice the claimed invention, Applicants, not seeking to be bound to theory, present a mechanism which explains the structure of the composite and a mechanism for the superior wear and friction properties provided by such composites according to the invention. Selection of a transfer film forming polymer and a second polymer which begin mobilizing (e.g. softening points) at similar temperatures after being intermixed and heated allows formation of at least one, and preferably both, an interconnected transfer film forming polymer from the plurality of film forming particles, and an interconnected second polymer from the plurality of second particles. For example, as noted above, softening points and/or "melting points" within 40° C., and preferably within 20° C. between the transfer film forming polymer and the second polymer is generally preferred.

Comparable softening points and melting points permits heating a mixture of the transfer film forming polymer particles and the second polymer particles, such as in a compression molding process, to a sufficiently high temperature so that significant mobility of at least one, and preferably both, of the respective particles is initiated close in time. The temperature used is low enough, however, to avoid chemical changes of either polymer, such as decomposition. As a result, the transfer film forming polymer particles preferentially melt together as the second polymer particles preferentially melt together.

Regarding an exemplary PTFE/PEEK composite, the wear rate measured has been found to be orders of magnitude lower than either PTFE or PEEK, and the COF can be lower than for the low friction transfer film forming polymer material. The origin of the low friction may originate from the transfer film. The transfer film is very thin, uniform and well adhered to the counterface. This is in direct contrast to PTFE, which does not form a good transfer film. Subsurface cracks propagate easily through PTFE, releasing large flakes of wear debris that are thought to be several microns thick for normal use conditions. This type of wear does not facilitate transfer film formation for neat PTFE. The flakes create bumps that build and create a higher friction situation than would otherwise be present.

It is thought that composites according to the invention provide regions of the mechanically strong polymer (e.g. PEEK) reinforced by the transfer film forming polymer (e.g. PTFE) surrounded by pockets of transfer film forming polymer. The reinforced areas keep cracks localized, allowing only small amounts of transfer film forming polymer to be released at a time. This small debris is less easily removed and is forced into counterface features. This is believed to create the mechanically strong polymer reinforced transfer film forming polymer sliding on a thin, uniform transfer film forming polymer film.

This same mechanism also helps explain the low wear of the composite with respect to its constituents. The mechanically strong polymer reinforcement keeps cracks from propagating through the composite material, so the material would be more wear resistant than the transfer film forming polymer. For example, PEEK is regarded as a low wear engineering polymers, but suffers from a scuffing type of wear in its neat state. This is due to the large amount of frictional energy that must be absorbed by the material. This scuffing is abated in the composite material since the drawn out transfer film forming polymer film protects the PEEK and drastically lowers the frictional energy at the interface.

When embodied as a PEEK/PTFE composite, the composite has been found to provide COF similar to, or in some cases better than PTFE. The PEEK can be standard PEEK based on oxy-1,4-phenylene-oxy-1,4-phenylene-carbonyl-1, 4-phenylene, or variants thereof.

The weight percent of the second polymer can be adjusted to accommodate a wide range of bearing requirements, such as low friction, low wear, high load capacity and low outgassing. The second polymer, such as PEEK, generally comprises at least 10 to 50 wt % of the composite, but can generally be up to about 90 wt % of the composite.

Industrially scalable methods for forming the composites according to the invention are now described relative to formation of a PEEK/PTFE composite. PTFE particles can be obtained commercially or synthesized in the laboratory. The particle size is preferably from about 1 µm to 20 µm. PEEK particles can also be obtained commercially, or again synthesized in the laboratory. The average size of the PEEK particles is preferably nanosize, such as on the order of 40 to 200 nm. However, the PEEK particles may be larger, such micron size, or smaller than this range.

In one embodiment, PTFE can be added to a mixing container and weighed using a precision analytical balance. The mixing container is preferably weighed continuously as the PEEK is then added to the PTFE, until the desired weight fraction of PEEK is obtained. The respective materials are generally unmixed after addition in a mixing chamber and consist mostly of agglomerations of PEEK and PTFE. A jet-mill apparatus or other type of suitable mixer can then be used to break up the agglomerated materials.

A jet mill uses high pressure air to accelerate the materials in a grinding chamber. The accelerated particles collide and break apart. The particles remain in the grinding chamber until they become small enough to move toward the outlet of the mill and into the collector. The milled material is preferably run through the jet-mill several additional times (e.g. two or three) to create a more uniform distribution.

After milling, the composite powder is preferably compression molded. This is the most common method of forming thermosetting materials and involves simply squeezing a material into desired shape by heat and pressure to the material in the mold. Prior to using the mold, residual materials and oxides are generally sanded off the mold, and the mold is cleaned with hot sonicated water. The mold is then preferably dried with high velocity air from a compressor (filtered and dried), and filled with blended material.

The powder mixture is preferably compressed at about 20 to 100 MPa at room temperature for 15 min. The pressure is then preferably reduced to about 10 to 20 MPa and held constant while the sample is heated and then cooled. In one embodiment, the sample is heated, such as at a rate of 120° C./hour to reach a maximum temperature sufficient to allow softening and mobilization of the plurality of transfer film forming polymer particles and the plurality of strengthening phase polymer particles. For PTFE and PEEK, respectively, a minimum temperature of at least about 330° C. and a maximum temperature in the range of 360-380° C. is generally preferred. In this temperate range, both PEEK and PTFE are near or above their respective softening points, and thus have significant mobility. The maximum temperature can be held constant for several hours, such as three (3 hours), and can be decreased to room temperature at the same rate. Somewhat higher temperatures can also be used, provided decomposition does not occur. For example, regarding PTFE comprising composites, as the temperatures approach about 420° C. or more, the PTFE C—F bonds start fracturing and resulting material is generally not useful.

The superior tribological performance of composites according to the invention provides for a wide variety of applications for the invention. Improved products providable from the invention include, but are not limited to bushings, self lubricating bearings, bearing inserts, orthopaedic devices, and plastic gears.

Space applications are also included, such as for improved space radar devices. Composites according to the invention will be highly stable in space environments. Significantly, unlike materials currently used for space radar, such as molybdenum disulfide, composites according to the invention do not measurably degrade during earth testing.

Regarding space applications, material outgassing and water absorption are of great concern in space bearing applications as they can result in instrument damage. ASTM E 595 is the test generally used as a standard for vacuum outgassing. This test measures total mass loss (TML), collected volatile condensable material (CVCM), and water vapor regained (WVR). Candidate space materials are generally rejected if TML>1.00% and CVCM>0.1%. A review of five random commercially available PEEK polymers indicates that the mean TML, CVCM and WVR reported were 0.39%, 0.01% and 0.1% respectively. The same review for PTFE yields an average TML, CVCM, and WVR of 0.034%, 0.00% and 0.02% respectively. PTFE performs much better than PEEK in vacuum, but both materials are regarded as good vacuum materials. All combinations of these polymers should meet the screening criteria. Water uptake is also an important consideration. Any water absorbed on earth will outgas once the material enters the low pressure environment. PTFE becomes saturated with 0.15% water uptake, and PEEK becomes saturated with 0.5% water uptake. These values are low compared to other polymers and are also generally acceptable for space applications.

The extreme temperature in space can cause melting and brittle fracture in some polymers. PTFE can be used in temperatures as high as 290° C. and as low as −200° C. PEEK can be operated as high as 150° C. to 300° C. (depending on grade) and as low as about −65° C. Accordingly, composites according to the invention, such as PTFE/PEEK composites are expected to be meet and fracture resistant for space applications in the temperature range specified for space applications of −40° C. to 100° C., or even through the broader military application temperature range specified (−55° C. to 125° C.).

Composites according to the invention can be compression molded into tubing. Following sectioning, the resulting tube sections can be used as bushings, such as around shafts. If the composite is formed as a solid rod, cutting can produce skived films which can provide sheets of the composite. Such sheets can be cut to a desired size, place on a part to be coated, including complex shaped parts, and then bonded together.

In another embodiment of the invention, a pure transfer film forming base polymer article or a pure mechanically strong polymer (e.g such as PEEK) article is formed, such as by molding, or otherwise acquired. A composite according to the invention which includes the material comprising the base polymer article, such as a PTFE/PEEK composite, can then be placed together with the base polymer article and then be heated to a temperature sufficient to initiate bonding between the base polymer article and the composite. For example, when the base polymer is PEEK, The composite coating becomes integrated with the base polymer article though bonding of the PEEK extending from the base polymer through the composite. The resulting article thus becomes highly resistant to delamination.

EXAMPLES

The present invention is further illustrated by the following specific examples, which should not be construed as limiting the scope or content of the invention in any way.

Example 1

Formation of a PTFE/PEEK Composite

PTFE material was obtained from Dupont Corporation, Wilmington, DE and particle sizes ranged from about 1 μm to 20 μm. PEEK particles were obtained from (Victrex PLC, UK) and believed to be on the order of 100 nm. The PTFE was added to a mixing container and weighed using a Mettler Toledo precision analytical balance. The mixing container was weighed continuously as PEEK was added to the PTFE, until the desired weight fraction of PEEK was obtained. These materials remained unmixed in the mixing container and consisted mostly of agglomerations. A Sturtevant jet-mill apparatus was used to break up these agglomerated materials.

After milling, the composite powder was compression molded. Prior to using the mold, residual materials and oxides are sanded off the mold, and the mold was cleaned with hot sonicated water for 15 minutes. The mold was then dried with high velocity air from a compressor (filtered and dried), and filled with blended material. A conventional heating press was used for compression molding.

The powder was compressed at 40 MPa (395 Atm) at room temperature for 15 min. The pressure was then reduced to 12 MPa (118 Atm) and held constant while the sample was heated and cooled. Four heaters were imbedded into heating platens on the top and bottom of the mold. A PID controller was used to obtain the desired temperature profile. The sample was heated at 120° C./hour up to 360° C. That temperature was held constant for 3 hours, and decreased to room temperature at the same rate. The molded samples were cylinders with a length of 1 inch and a diameter of 0.75 inch. A numerically controlled milling machine was used to cut the ¼ inch×¼ inch×½ inch pin from the molded puck.

Example 2

Tribological Testing

Data shown in FIGS. 1, 2, 3, 4 and 6 were based on the following procedure:

The mold used produced 19 mm diameter×~25 mm long cylinders. Samples measuring 6.4 mm×6.4 mm×12.7 mm were machined out of the interior of the compression molded cylinders using a laboratory numerically controlled milling machine. The finished samples were then measured and weighed and a density of the sample was calculated from these measurements. Only 1 sample was made from each compression-molded cylinder.

The counterfaces were plates made from 304 stainless steel measuring 38 mm×25.4 mm×3.4 mm. This material had a measured Rockwell B hardness of 87.3 kg/mm². Wear tests were performed on pins under dry sliding conditions against a 161 nm $R_{rms}$ (with a standard deviation of 35 nm) lapped counterface. A linear reciprocating tribometer was used to test the composite material according to the invention. The counterface was mounted to a table that reciprocates 25 mm in each direction and was positioned with a stepper motor and ball screw system.

Prior to testing the counterfaces were washed in soap and water, cleaned with acetone, sonicated for ~15 minutes in methanol, and then dried with a laboratory wipe. The nanocomposites were wiped down with methanol but were not washed or sonicated. The pin sample was mounted directly to a 6-channel load cell that couples to a linear actuator. Labview software was used to control two electro-pneumatic valves that pressurize the loading cylinder. Table position, pin displacement, friction force and normal force were recorded with the same software. The normal load applied to the pin was 250 N, and the sliding velocity was 50 mm/s. The entire apparatus was located inside a soft-walled clean room with conditioned laboratory air of relative humidity between 25-50%.

The mass of the pin was measured with a Mettler Toledo AX205 precision analytical balance that has a range of 220 g and a resolution of 10 μg. The mass loss of the sample, the density of the material, the total test sliding distance and the time averaged normal load are used to calculate the wear rate with the following equation:

$$K(mm^3/Nm) = \frac{\text{Mass loss(mg)}}{\rho\left(\frac{mg}{mm^3}\right)F(N)\cdot d(m)} \qquad \text{Eqn. 1}$$

The tests are interrupted periodically so the sample can be weighed. The uncertainty in each measurement was entered into a Monte Carlo simulation, which was used to calculate the average wear rate and the uncertainty in that wear rate.

FIG. 1 shows the wear rate (y-axis) of an exemplary PTFE/PEEK composite according to the invention as a function of PTFE wt % (x-axis; balance PEEK) as compared a PTFE filled PEEK composite according to Briscoe et al. The wear rate of the composite according to the invention shown in FIG. 1 is between 60 and 100 wt. % PTFE. When the wt. % PTFE is around 80%, the wear rate of the composite according to the invention is at least two orders of magnitude lower than the wear rate provided a 80 wt. % PTFE (20% PEEK) composite according to Briscoe et al. This data provides strong evidence of significant structural differences for polymer/polymer composites according to the invention, as compared to conventional filled polymer composites comprising a plurality of unconnected filler particles, such as disclosed by Briscoe et al.

Figure 2:
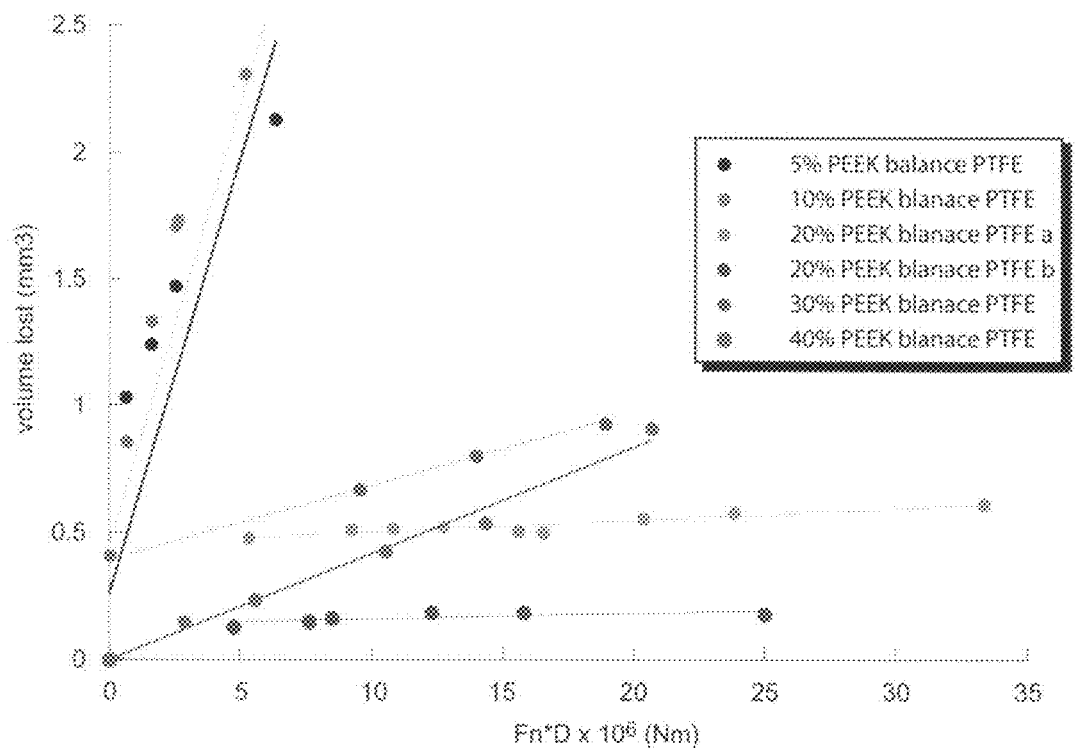
FIG. 2 shows results obtained from wear tests for various exemplary PTFE/PEEK compositions according to the invention.

Uninterrupted test results from wear tests on a composite material according to the invention performed using 5, 10, 15, 20, 30 and 40 wt % PEEK (balance PTFE) compositions are shown in FIG. 2. Compositions referred to as 20a and 20b refer to the same 20 wt. % PEEK sample on the day of testing all the samples (a), and retesting results obtained about 5 days thereafter (b). When the PEEK wt. % is at least 20 wt. %, the composites showed exceptional and unexpected wear performance with almost no visual wear after two weeks of continuous sliding, and no measurable wear (>0.01 mg) on the Mettler precision balance for 1,000,000 cycles of sliding.

Figure 3:
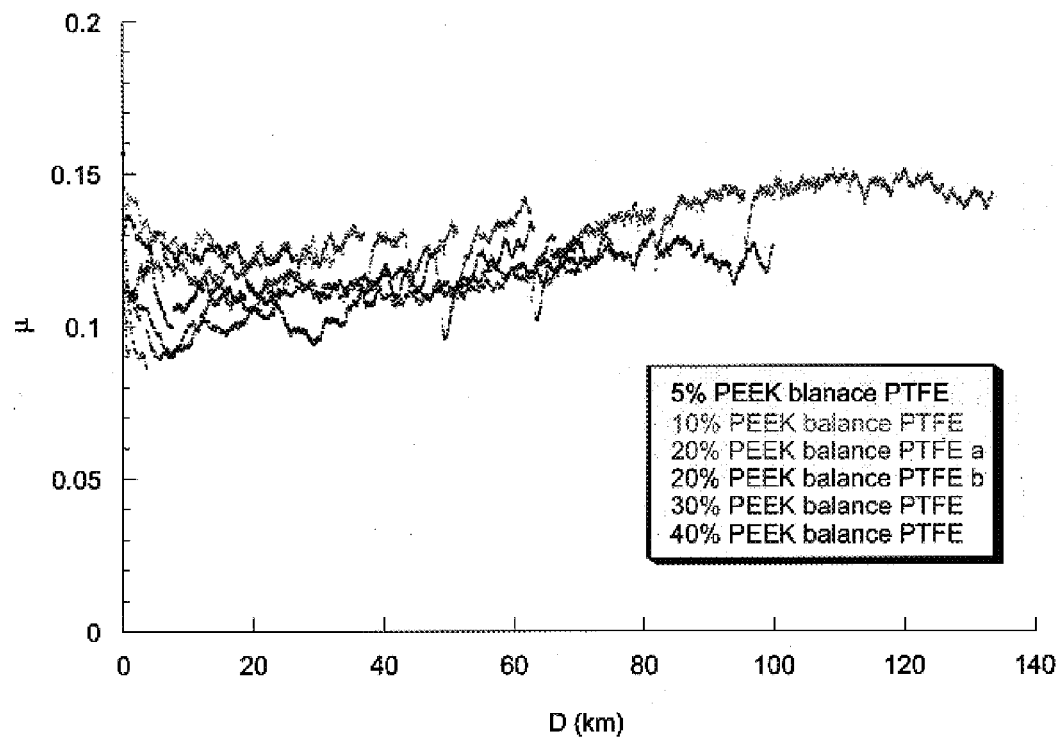
FIG. 3 shows instantaneous friction results for the composites for which wear test data is shown in FIG. 2.

Friction has also be found to be very low for composites according to the invention. FIG. 3 shows instantaneous friction for each composite for the duration of two wear tests.

FIG. 3 shows average COF results obtained from the 5, 10, 15, 20(a) and (b), 30 and 40 wt % PEEK (balance PTFE) composites to be from about 0.1 to 0.13. For comparison, PTFE has had friction coefficients ranging from 0.11 to 0.15 under the same testing conditions. Thus, PEEK/PTFE composites according to the invention were found to provide a friction coefficient comparable to, or lower than PTFE.

Figure 4:
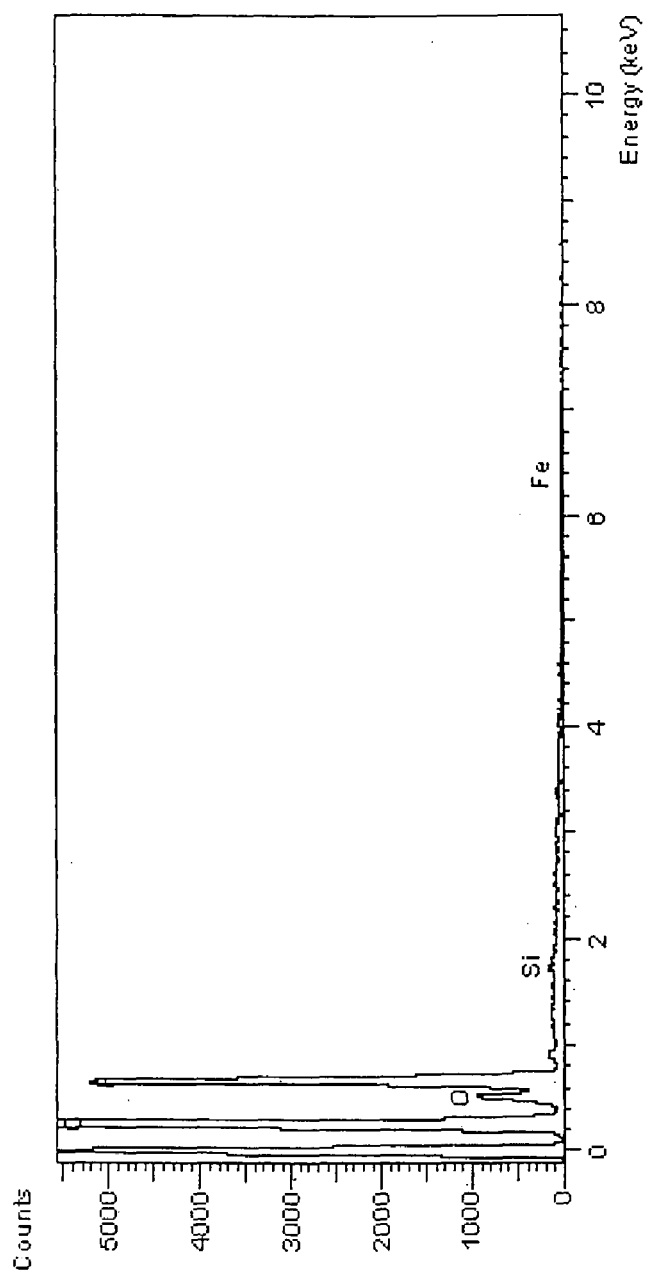
FIG. 4 shows EDS results of pin wear surface tests from a PEEK/PTFE composite according to the invention demonstrating the material is highly non-abrasive.

FIG. 4 shows EDS results of pin wear surface tests from a PEEK/PTFE composite according to the invention using a 20 wt % PEEK (balance PTFE) composition. The results demonstrate the material is non-abrasive as there is no Fe on the pin wear surface detected by the EDS measurement after 140 km of sliding. This result can be compared to PTFE which was found to wear out to the point it can no longer be tested after only 1 km of sliding.

FIG. 5(a) is a SEM and FIG. 5(b) a fluorine map of a PTFE/PEEK composite according to the invention. The light portions in each are PTFE regions.

FIG. 6 are images of cross sections of PTFE/PEEK composite according to the invention using surface interferometry before and after wear testing. In the pre-worn state, the cross sections show PTFE regions raised above smaller regions of PEEK. The scans of the wear surfaces show almost 100% PEEK. This can be explained by the PTFE regions being consumed in sliding and transfer film development leaving the PEEK behind.

These results confirm the PEEK is an interconnected network. If the PEEK phase was in the form of dispersed particles, as the PTFE which provide the casing around such particles was removed, the PEEK particles would have separated from one another.

Figure 7:
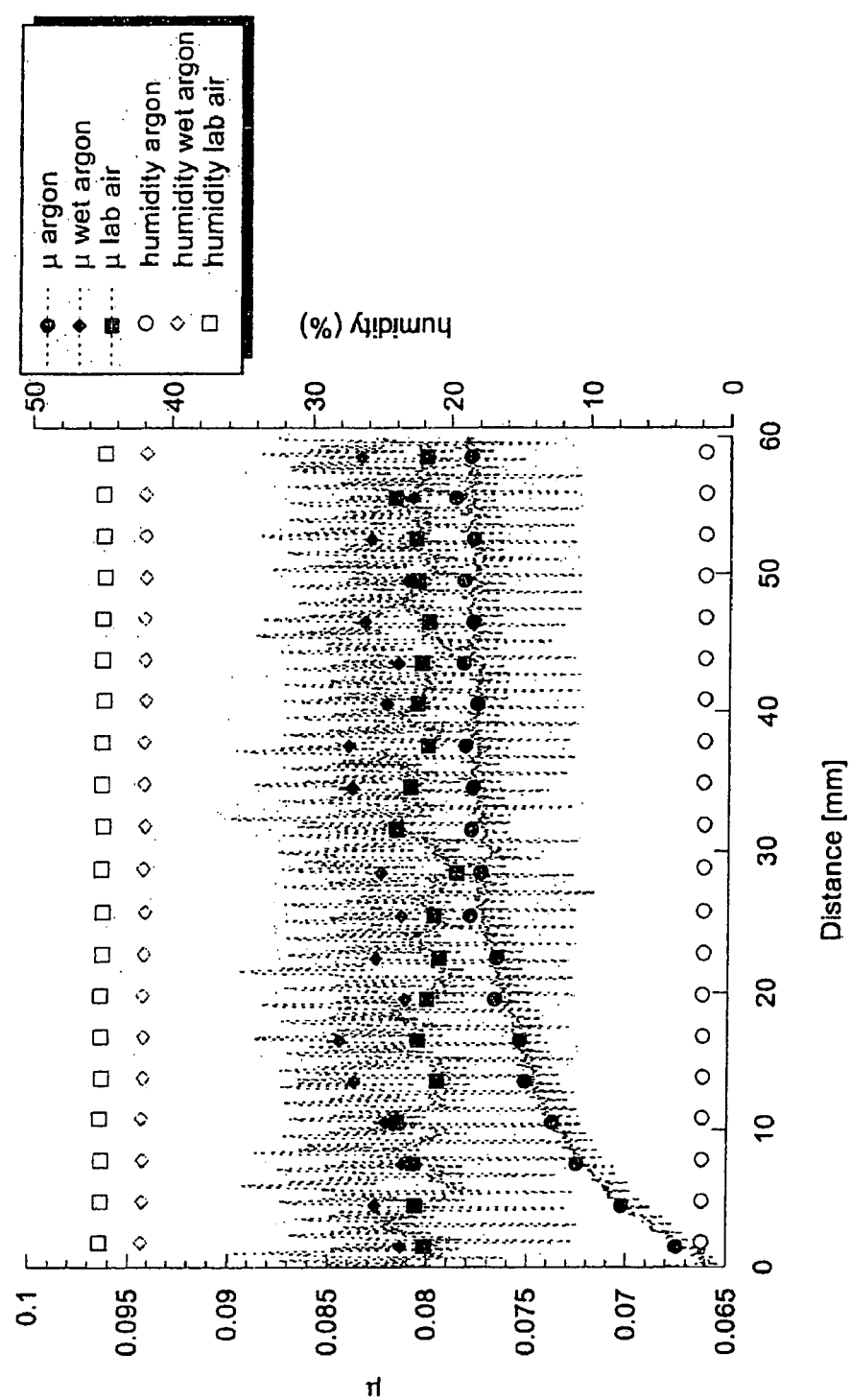
FIG. 7 shows friction coefficient vs. sliding distance results for a PEEK/PTFE composite according to the invention having 20 wt. % PEEK (balance PTFE) showing environmental insensitivity.

FIG. 7 shows friction coefficient vs. sliding distance results for a PEEK/PTFE composite according to the invention having 20 wt. % PEEK (balance PTFE) showing environmental insensitivity to humidity and air. Data shown in FIGS. 7 and 8 were obtained under environmentally controlled conditions. FIG. 7 shows that the composite is insensitive to water and other species notorious for dramatically changing the tribological characteristics of conventional advanced materials. The pin was a steel ball with a 1 mm radius, loaded to 0.45 N and was reciprocated at 5 mm/s on the composite. Max pressure was about 80 MPa.

Figure 8:
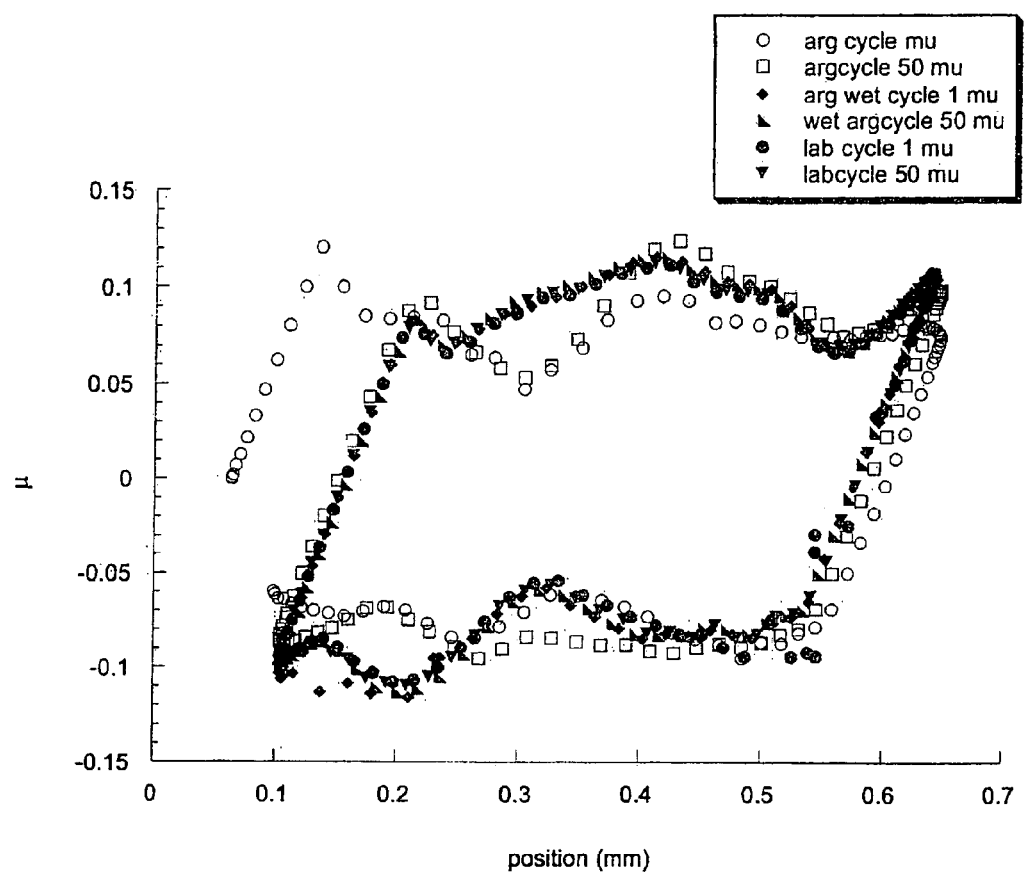
FIG. 8 shows positional data from FIG. 7 demonstrating repeatability of the friction coefficient.

FIG. 8 shows friction results for one reciprocation cycle for the beginning and end of each condition. The data shown in FIG. 8 demonstrates repeatability of the friction coefficient tests shown in FIG. 7.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A method of forming a high performance composite, comprising the steps of:

providing a plurality of transfer film forming particles of a first polymer and a plurality of strengthening phase particles of a second polymer, wherein said second polymer comprises a thermoplastic polymer, said second polymer particles average from 50 nm to 1 μm, and said first polymer comprises PTFE and is at least 10 weight % of said composite, and molding or extruding said plurality of first polymer particles and said plurality of second polymer particles at a temperature sufficient to allow softening and mobilization of at least one of said first polymer particles and said second polymer particles, wherein said composite is formed which provides a wear rate of <$10^{-7}$ mm$^3$/Nm, said composite being an interpenetrated network structure.

2. The method of claim 1, further comprising the step of jet milling said plurality of first polymer particles and said plurality of second polymer particles before said molding step.

3. The method of claim 1, wherein said plurality of first polymer particles average from 1 to 100 μm and said plurality of second polymer particles average from 50 nm to 1 μm.

4. The method of claim 1, wherein a softening point of said second polymer is within 40° C. of a softening point of said PTFE.

5. The method of claim 1, wherein said second polymer comprises between 15 wt % and 50 wt % of said composite.

6. The method of claim 1, wherein a softening point of said second polymer is within 20° C. of a softening point of said PTFE.

7. The method of claim 6, wherein an average friction coefficient of said composite is no more than 0.15.

8. The method of claim 1, wherein a wear rate of said composite is <$10^{-8}$ mm$^3$/Nm.

9. The method of claim 1, further comprising the steps of:
providing a base polymer article consisting essentially of said PTFE or said second polymer;
disposing said composite and said base polymer article together, and
heating said composite to a temperature sufficient to allow said composite to become integrated with said base polymer article.

10. The method of claim 9, wherein said base polymer article comprises a polyaryletherketone.

11. The method of claim 1, wherein said molding comprises compression molding.

* * * * *